US010607048B2

(12) United States Patent
Paolizzi et al.

(10) Patent No.: US 10,607,048 B2
(45) Date of Patent: Mar. 31, 2020

(54) ERGONOMIC PORTABLE DATA ACQUISITION TERMINAL (71) Applicant: Datalogic IP Tech S.r.l., Lippo di Calderara di Reno (Bologna) (IT)

(72) Inventors: Simone Paolizzi, Rimini (IT); Giovanni Minafò, Cento (IT); Daniele Fiorini, Casalecchio di Reno (IT); Dimitri D'Annunzio, Zola Predosa (IT)

(73) Assignee: DATALOGIC IP TECH S.R.L., Lippo di Calderara di Reno (BO) (IT)

( * ) Notice: Subject to any disclaimer, the term of this patent is extended or adjusted under 35 U.S.C. 154(b) by 0 days.

(21) Appl. No.: 16/218,360

(22) Filed: Dec. 12, 2018

(65) Prior Publication Data
US 2019/0197272 A1 Jun. 27, 2019

Related U.S. Application Data (60) Provisional application No. 62/609,169, filed on Dec. 21, 2017.

(51) Int. Cl.
*G06K 7/10* (2006.01)
*G06F 1/16* (2006.01)
(Continued)

(52) U.S. Cl.
CPC .......... *G06K 7/10881* (2013.01); *G06F 1/16* (2013.01); *G06F 1/1635* (2013.01);
(Continued)

(58) Field of Classification Search
CPC .......... G06K 7/10821; G06K 7/10881; G06K 7/1404; G06F 1/1633; G06F 1/1662;
(Continued)

(56) References Cited

U.S. PATENT DOCUMENTS 5,764,180 A 6/1998 Cummings
6,512,511 B2 1/2003 Willner et al.
(Continued)

FOREIGN PATENT DOCUMENTS

JP 2006338122 A 12/2006

OTHER PUBLICATIONS

Rii i28C Mini Wireless Keyboard Remote Mouse 2.4 GHz Wireless Riitek, [online], Retrieved from the Internet: <URL: www.riitek.com/product/i28c.html>, last visited on Nov. 28, 2017, 3 pages.
(Continued)

*Primary Examiner* — Thien M Le
*Assistant Examiner* — April A Taylor
(74) *Attorney, Agent, or Firm* — Stoel Rives LLP (57) ABSTRACT A portable data terminal including a main housing, a landscape-oriented large display screen disposed on a top front portion of the main housing and extending nearly an entire width of the main housing, a keyboard disposed on top of the main housing and rearward to the display screen, and left and right battery housings serving as ergonomic handle grips disposed on an underside of the main housing to accommodate two-handed grasping of the device, the keyboard being constructed and arranged to receive input from a pair of thumbs while corresponding hands are grasping and supporting the main housing. In an embodiment, the main housing includes a central housing portion extending downwardly on the underside of the main housing and having an extended front face for containing a scan engine/data reading mechanism and first and second cameras positioned on opposite lateral sides of the scan engine.

20 Claims, 9 Drawing Sheets (51) Int. Cl.
*G06F 3/02* (2006.01)
*H01H 13/84* (2006.01)
*A63F 13/24* (2014.01)
*A63F 13/92* (2014.01)

(52) U.S. Cl.
CPC .......... *G06F 1/1662* (2013.01); *G06F 1/1686* (2013.01); *G06F 1/1696* (2013.01); *G06F 3/0202* (2013.01); *G06F 3/0216* (2013.01); *A63F 13/24* (2014.09); *A63F 13/92* (2014.09); *H01H 13/84* (2013.01); *H01H 2217/034* (2013.01)

(58) Field of Classification Search
CPC ........ G06F 1/1686; G06F 1/1696; G06F 3/02; G06F 3/0202; G06F 3/021; G06F 3/0213; G06F 3/0219; G06F 3/0231; H01H 13/83; H01H 13/84; H01H 2223/04; A63F 13/20; A63F 13/23–25; A63F 13/90; A63F 13/92; A63F 13/98
See application file for complete search history.

(56) References Cited

U.S. PATENT DOCUMENTS

| | | | | |
|---|---|---|---|---|
| 7,475,821 | B2* | 1/2009 | Barkan | G06K 7/10722 235/454 |
| 7,868,753 | B2 | 1/2011 | Jenkins et al. | |
| 8,014,148 | B2* | 9/2011 | Mori | G06F 1/1626 361/679.56 |
| 9,785,204 | B1* | 10/2017 | Miller | H04N 13/254 |
| 9,895,606 | B1* | 2/2018 | Kamata | A63F 13/24 |
| 2003/0034903 | A1 | 2/2003 | Levin et al. | |
| 2004/0157116 | A1* | 8/2004 | Perkins | H01M 2/1055 429/99 |
| 2008/0174556 | A1 | 7/2008 | Jo | |
| 2010/0079938 | A1* | 4/2010 | Paschke | G06F 1/1624 361/679.14 |
| 2010/0097247 | A1 | 4/2010 | Martin | |
| 2012/0193431 | A1* | 8/2012 | Hawley | G06K 7/10851 235/472.01 |
| 2012/0286043 | A1* | 11/2012 | Leonardi | G06K 7/0008 235/440 |
| 2015/0220766 | A1* | 8/2015 | Russell | G06K 7/10881 235/462.42 |
| 2016/0051901 | A1* | 2/2016 | Townley | A63F 13/06 463/31 |
| 2017/0357837 | A1 | 12/2017 | Minafò et al. | |
| 2018/0059758 | A1* | 3/2018 | Boatner | G06K 7/10881 |

OTHER PUBLICATIONS

TNP Xbox One Controller Keyboard Chatpad Attachment—Wireless 2.4G Keypad Adapter Text Messenger Input Accessory for XBox One, [online], Retrieved from the Internet: <URL: www.amazon.com/TNP-Xbox-Controller-Keyboard-Chatpad-Attachment/dp/B01N9KE3BK>, last visited on Nov. 28, 2017, 6 pages.

Wireless Controller Messenger Game Keyboard Keypad Chatpad for XBOX 360 Black—[online], Retrieved from the Internet: <URL: www.walmart.com/ip/Wireless-Controller-Messenger-Game-Keyboard-Keypad-ChatPad-For-XBOX-360-Black/322999637?>, last visited on Nov. 28, 2017, 3 pages.

European Search Report, European Patent Application No. 18215291.8, Datalogic IP Tech S.r.l., dated May 22, 2019, 7 pages.

* cited by examiner fig.1 fig.2

ERGONOMIC PORTABLE DATA ACQUISITION TERMINAL

RELATED APPLICATION DATA

This application claims priority under 35 U.S.C. § 119(e) to U.S. Provisional Application No. 62/609,169 filed on Dec. 21, 2017, hereby incorporated by reference.

BACKGROUND

The field of this disclosure relates generally to systems and methods for data reading and/or image capture, and more particularly, to portable data acquisition terminals and mobile computers.

The industrial mobile computer market is trending in the direction of increasing the size of displays and providing capacitive touch display panels. Thus, mobile computer manufacturers are moving toward designing devices without a physical keyboard. The present inventors have recognized that a portable data terminal with a large touch display panel does not conform well to having a large size physical keyboard. Nonetheless, the present inventors have recognized that it may be desirable to provide a portable data terminal with a large display and a large physical keyboard and yet meet requirements for ergonomics and ease of use.

BRIEF DESCRIPTION OF THE DRAWINGS

Understanding that drawings depict only certain preferred embodiments and are not therefore to be considered to be limiting in nature, the preferred embodiments will be described and explained with additional specificity and detail through the use of the accompanying drawings.

DETAILED DESCRIPTION OF EMBODIMENTS

With reference to the drawings, this section describes particular embodiments and their detailed construction and operation. The embodiments described herein are set forth by way of illustration only and not limitation. The described features, structures, characteristics, and methods of operation may be combined in any suitable manner in one or more embodiments. In view of the disclosure herein, those skilled in the art will recognize that the various embodiments can be practiced without one or more of the specific details or with other methods, components, materials, or the like. In other instances, well-known structures, materials, or methods of operation are not shown or not described in detail to avoid obscuring more pertinent aspects of the embodiments.

For ease of description, an element numeral in one figure used to identify an element may be used to identify the same or like element in another figure.

FIGS. 1-6 illustrate a portable data terminal (PDT) 100 according to an embodiment. The PDT 100 may also be referred to as a mobile computer. Embodiments described herein are particularly applicable to the industrial mobile computer market, useful for warehouse inventory management, parcel shipping/tracking/delivery, cargo management, and/or courier tracking and delivery management. The PDT 100 includes a data reader (see the scan engine 162 of FIG. 6) that reads optical codes within a read region 20 projected out from a front portion of the PDT 100 along the center axis 22.

Figure 1:
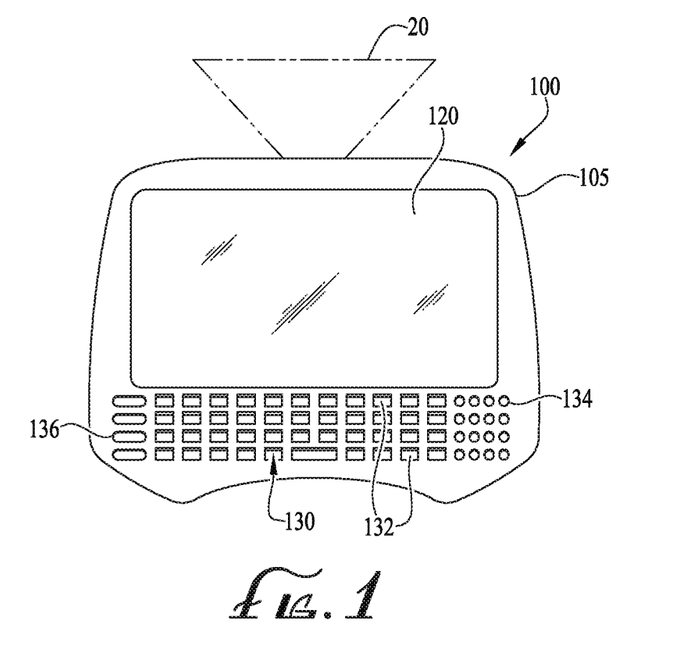
FIG. 1 is a diagrammatic top view of a portable data acquisition terminal according to an embodiment.

The PDT 100 includes a main housing 105 having a large landscape-orientated display screen 120 disposed in an upper top portion of the top surface of the main housing 105, and a large keyboard 130 disposed in the top portion below the display screen 120. The display screen 120 is shown as a large screen extending generally (or nearly) the entire width of the main housing 105, the display screen 120 being in the landscape orientation. The display screen 120 may be any suitable type of display such as a liquid crystal display (LCD) and may alternately be a touch screen controllable by finger touch (with or without glove) or via a stylus. In a preferred embodiment, the display screen 120 may have a minimum screen diagonal within a range from 4 inches to 8 inches (10.2 cm to 20.3 cm), or more preferably within the range of 4.7 inches and 6 inches (12 cm to 15.2 cm). The physical keyboard 130 is positioned below a major dimension of the display screen 120.

Figure 2:
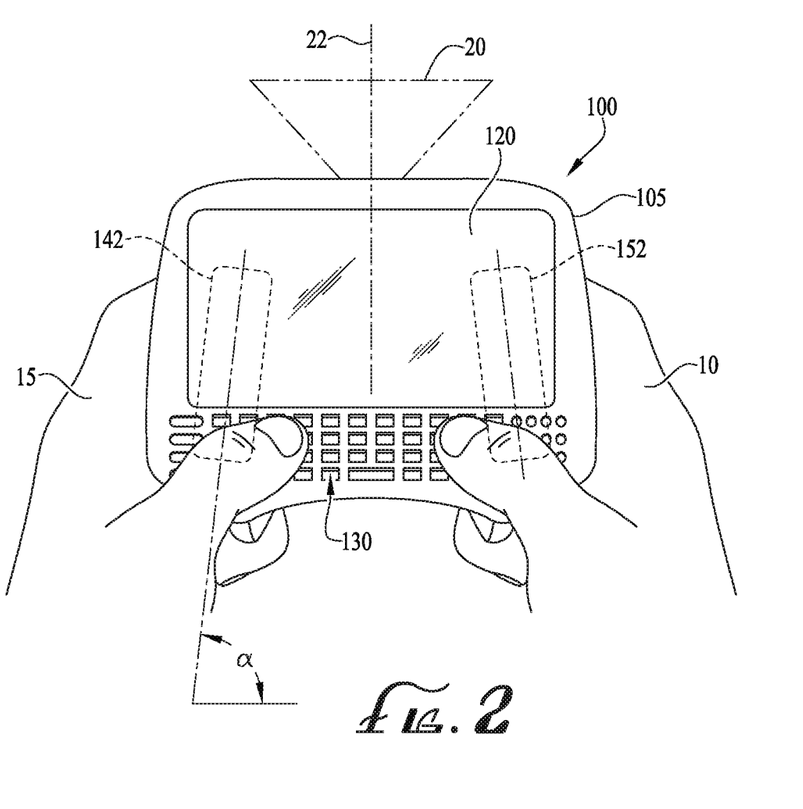
FIG. 2 is a diagrammatic top view of the portable data acquisition terminal of FIG. 1, shown being gripped by a user.
Figure 3:
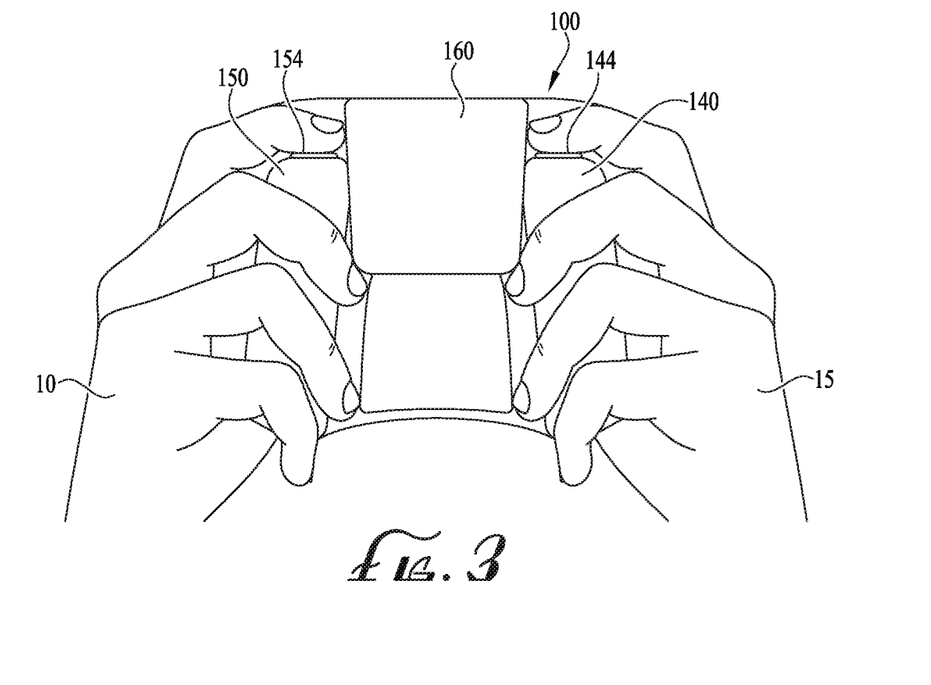
FIG. 3 is a diagrammatic bottom view of the portable data acquisition terminal of FIG. 1, shown being gripped by a user.

The PDT 100 is powered by a power source comprising a pair of large cylindrical batteries 142, 152 disposed in respective battery housings 140, 150. The battery housings 140, 150 containing the batteries 142, 152 are disposed on the underside of the main housing 105. The battery housings 140, 150 (and thus also the batteries 142, 152) are oriented at a diagonally inward angle α (see FIG. 2) to the center axis 22 from the rear to the front of the unit to provide a symmetrical and balanced weight distribution and an ergonomic design form factor for two-handed gripping by right-hand 10 and left-hand 15 as shown in FIGS. 2-3. The position of the batteries 142, 152 within the battery housings 140, 150 is illustrated by the dashed lines in FIGS. 2 and 4 and by the battery cross-section(s) in FIGS. 5 and 13.

Each of the batteries 142, 152 may comprise a single battery unit, or may comprise multiple battery units or a battery pack. Preferably, the batteries 142, 152 are rechargeable battery type such as lithium ion, lithium polymer, or nickel-metal hydride, but may be other type of batteries or power storage.

The large design of the keyboard 130, combined with the angular battery housings 140, 150, permits not only ergonomic gripping but also convenient and comfortable two-thumb typing. The accommodation of a large keyboard 130 also permits the keyboard to be a QWERTY-type keyboard or other suitable keyboard configuration, including letter and number keys 132. The keyboard 130 may further include installation of a joy stick, directional keys 136, number keypad keys 134, a toggle controller, or other control features to control cursor movement or otherwise control the display screen 120 and operate the PDT 100 without use of a touch panel. This ergonomic housing/keyboard arrangement may provide a fast typing configuration, with improved typing comfort resulting in an increase in productivity and ease of use.

Figure 4:
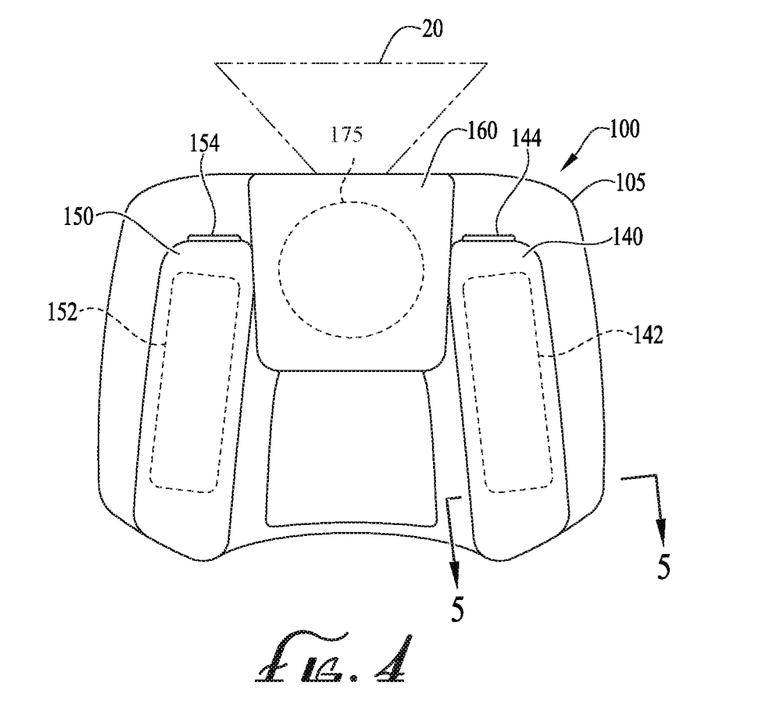
FIG. 4 is a diagrammatic bottom view of the portable data acquisition terminal of FIG. 1, illustrating position of internal components.
Figure 5:
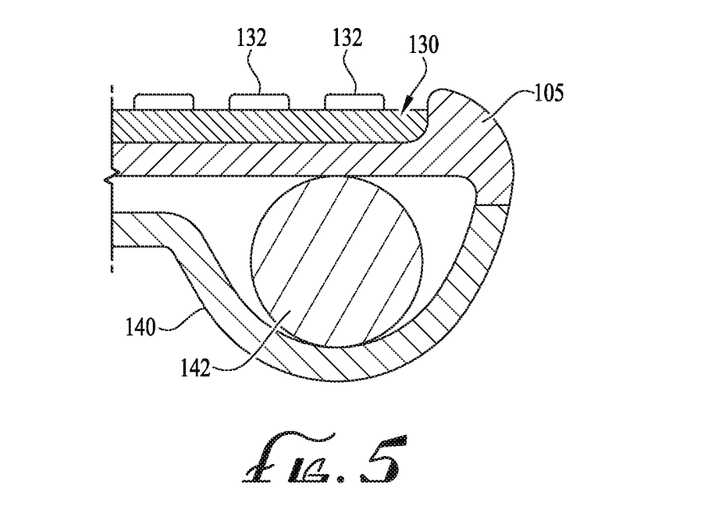
FIG. 5 is a partial cross-sectional view of FIG. 4 taken along lines 5-5.
Figure 6:
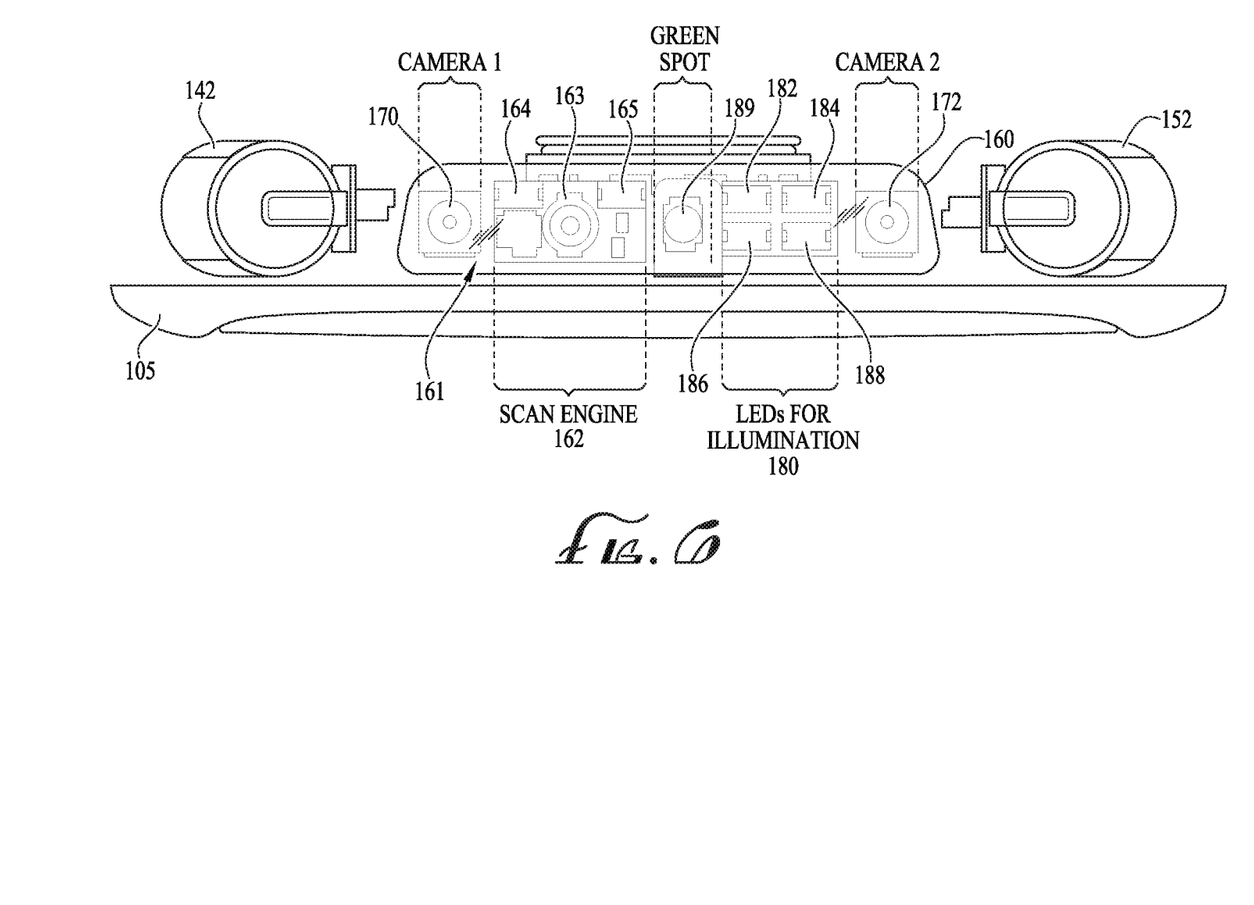
FIG. 6 is a diagrammatic front view of the portable data acquisition terminal of FIG. 1, with portions of the housing and other elements removed to show internal components.

The PDT 100 includes an electronics package 161 disposed in a front face of the main housing 105. The electronics package 161 includes a data reader (details of the data reader are described below with reference to FIG. 6) operable to read optical codes or other items in a read region 20 in front of the PDT 100. The electronics package 161 may be disposed in a central housing portion 160 of the main housing 105 (as shown in FIGS. 3-4, 6).

In some embodiments, the PDT 100 may also include an inductive receiving coil charging element 175 disposed on the underside of the central housing portion 160 and configured to charge a power supply (e.g., the first and second batteries 142, 152). The inductive receiving coil charging element 175 may be positioned between the left and right battery housings 140, 150 and below the display screen. With current battery technology, the two cylindrical batteries 142, 152 may reach 7000 mAh, may be charged in about 240 minutes using fast wireless charging, and may provide more than 10 continuous working hours. Alternately, PDT 100 may be provided with physical charging contacts (for example in the central housing portion 160), or a charging plug, in addition to or in place of the inductive charging element 175.

The charging element 175 may be large due to the space available between the battery housings 140, 150. The charging element 175 may comprise 30% (or more) of the width of the main housing 105

The PDT 100 may also be provided with physical touch trigger keys, namely a left trigger key 144 disposed on the front of the left battery housing 140 and a right trigger key 154 disposed on the front of the right battery housing 150. The trigger keys 144, 154 are actuated by depressing them using an index finger while the hands are gripping the ergonomic battery housings 140, 150 as shown in FIG. 3. The trigger keys 144, 154 may be used to control or actuate the data reader to scan optical codes, but may also be used to activate a specific function dependent on the application used, for example:

Execute commands such as cut, copy, paste or insert special characters in certain applications;
Move the cursor around text when users enter the text input environment;
Take photos when a camera app is used or scroll pictures in the photo gallery;
Activate a 3D scan in case of stereoscopy; and/or
Actuate controls during VOIP calls.

The PDT 100 may be also designed to attach fixed, movable or removable features or accessories to facilitate the usage of the keyboard 130, enhance visibility of the display screen 120, or to enable scanning objects when resting on a surface.

The PDT 100 provides a superior form factor for a mobile computer that may provide one or more of the following advantages:

Provide a full QWERTY keyboard allowing the device to be operated without requiring a touch panel;
Increase productivity for users who need to continuously type on the keyboard;
Improve overall balance and typing comfort even in (optional) handle configuration;
Increase power on time (i.e., energy storage) due to the contemporary use of two or more batteries; and/or
Configure the display in landscape orientation may be advantageous for some applications, such as texting, document typing, or GPS navigation.

An embodiment of an internal electronics package 161 is diagrammatically illustrated in FIG. 6, which includes left and right cameras 170, 172 and a data reader comprising a scan engine 162, separate (optional) illumination source 180, and a good read indicator 189 (shown as the "Green Spot" indicator). The components of the electronics package 161 are disposed within the central housing portion 160. FIG. 6 also illustrates positions of the batteries 142, 152 on opposite sides of the central housing portion 160.

The data reader comprises a scan engine 162 comprising internal electronics and a reading mechanism such as an imager 163 (typically comprising a CCD or CMOS sensor and lens element) for reading optical codes placed in the read region 20 of the PDT 100. Alternately the scan engine 162 may comprise some other reading mechanism such as a laser scanner or other suitable optical code or item reading mechanism. Still alternately, the scan engine 162 may comprise some other data reader such as an RFID reader, or a combined RFID/optical code reader.

Figure 7:
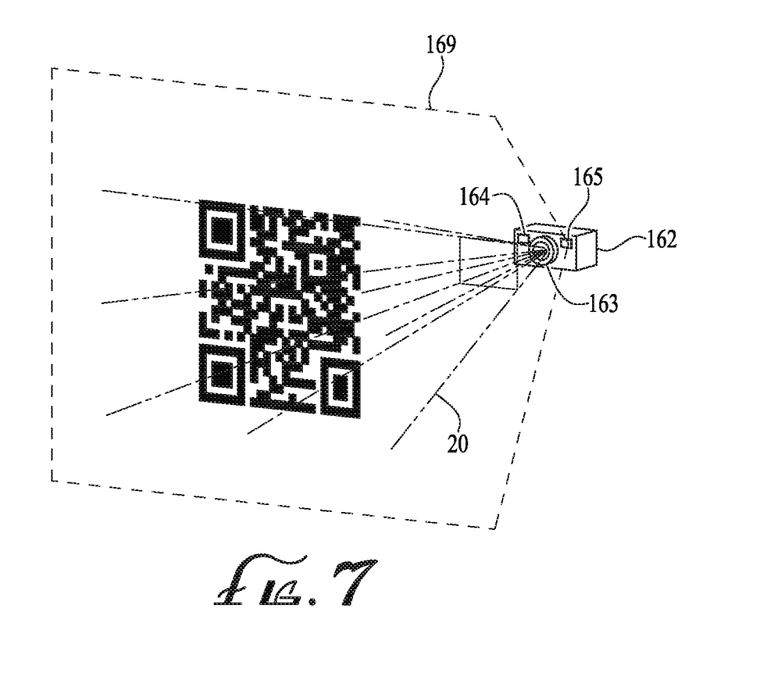
FIG. 7 is a perspective front view of a scan engine and scan/illumination patterns for the data reader of FIG. 6.
Figure 8:
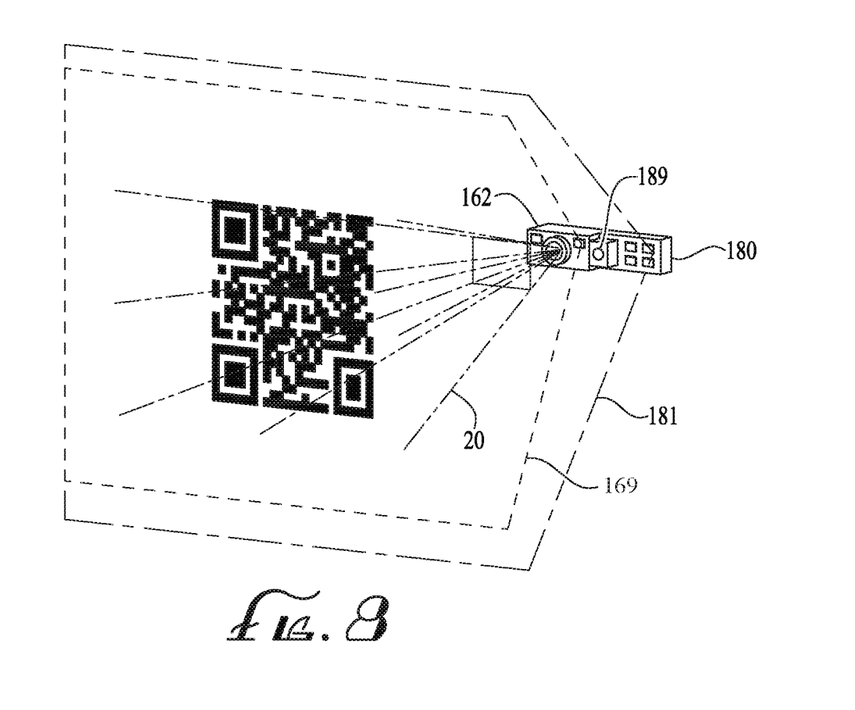
FIG. 8 is a perspective front view of a scan engine and alternate illumination module and scan/illumination patterns for a data reader as in FIG. 6.

Though an imaging reader may read optical codes using only ambient light, the scan engine 162 may further comprise its own illumination source, such as light emitting diodes (LEDs) 164, 165 which produce an illumination field 169 (as shown in FIGS. 7-8). Alternately, one or more of the LEDs 164, 165 may comprise aiming illumination to assist the user in aiming the data reader onto an object/optical code. In place of or in addition to the illumination by LEDs 164, 165, a separate (optional) illumination source 180, for example comprised of LEDs 182, 184, 186, 188, may be provided to produce a secondary (or primary) illumination field 181 to illuminate the read region 20.

In embodiments wherein the scan engine 162 comprises an optical code reader, the electronics package 161 may include the good indicator mechanism 189 in the form of a light source, for example a light emitting diode (LED) with or without an optional focusing lens. The indicator light source (which will be hereinafter referred to as the indicator LED) is preferably independently powered with respect to any other LEDs (or laser diodes) used by the data reader that projects a spot of light, visible to the user, on or in the vicinity of the optical code signifying a successful read by the data reader, thereby signifying a "good read." It is desirable that the indicator LED be sufficiently luminous for generating a luminous figure (e.g., a round spot of light) on the object being read that is clearly visible in a well-lighted environment. A suitable green light LED may comprise an epoxy resin package having a diameter of 5 mm, peak wavelength of w=524 nm and emission angle of 15°, such LEDs being available from various manufacturers. Alternatively, conventional SMD package LEDs can be used in conjunction with a collimating or focusing lens and possibly a suitable aperture to shape the beam of light emitted by the LED. The indicator LED of the good read indicator 189 may emit light of any suitable color, but green light is preferably used. A green light provides positive indications or indications of a good operation, as for traffic lights or the indication LEDs on electronic equipment, and in addition, the light of the illuminator for acquiring the code is usually red; thus, green light allows highlighting the difference with respect to the light projected for illuminating the optical code for its acquisition. Further, the good read indicator is advantageous for noisy environments where the standard beep of a positive read cannot be heard.

The large landscape form factor of the PDT 100 also permits the inclusion of the left and right cameras 170, 172 that may acquire 3D data using stereoscopy techniques (e.g., to acquire volumetric information on a potentially bulky 3D package/parcel/item where a large 3D field of view is needed), and one or more of these cameras may be employed as thermocameras (thermal imaging cameras) or distance measuring equipment (e.g., measuring 3D objects). Alternately, the cameras 170, 172 may be used as additional data reading imagers. Such spacing of the left and right cameras 170, 172 used as data readers may provide advantages for alternately reading optical codes from different angles which may useful for reading optical codes on reflective surfaces that otherwise are unreadable due to light saturation from reflected illumination.

Figure 9:
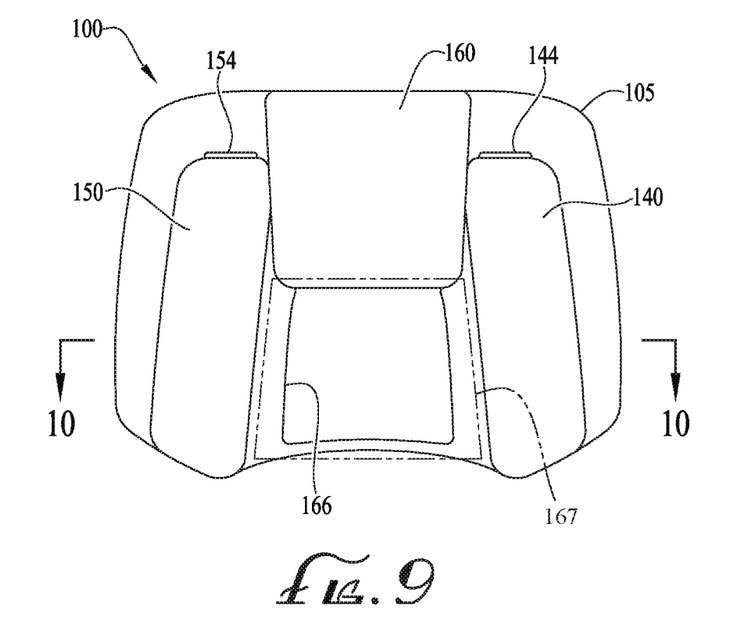
FIG. 9 is a diagrammatic bottom view of an alternate portable data acquisition terminal, illustrating an accessory mating feature.
Figure 10:
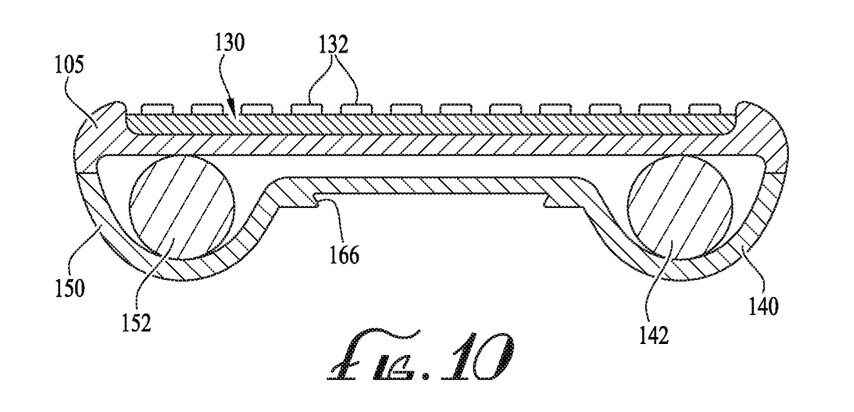
FIG. 10 is a cross-sectional view of FIG. 9 taken along lines 10-10.
Figure 11:
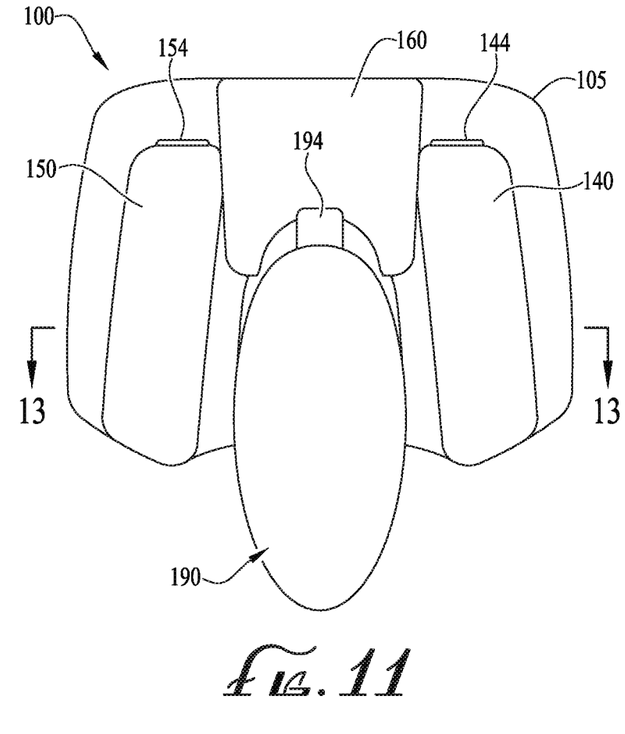
FIG. 11 is a diagrammatic bottom view of the portable data acquisition terminal as in FIG. 9 having a handle accessory mounted to the accessory mating feature.
Figure 12:
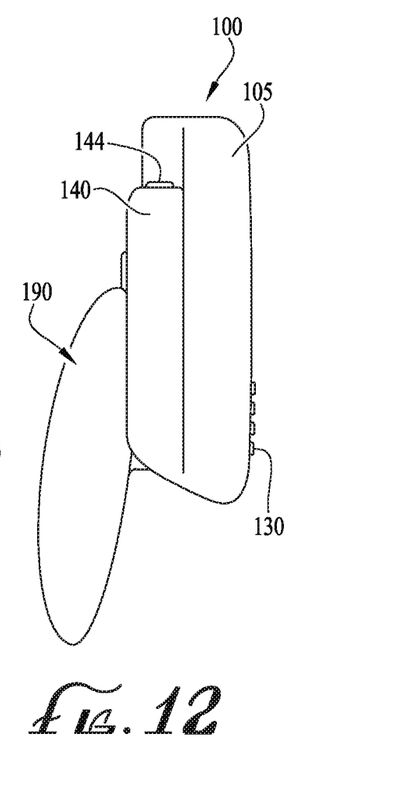
FIG. 12 is a side view of the portable data acquisition terminal and handle accessory of FIG. 11.
Figure 13:
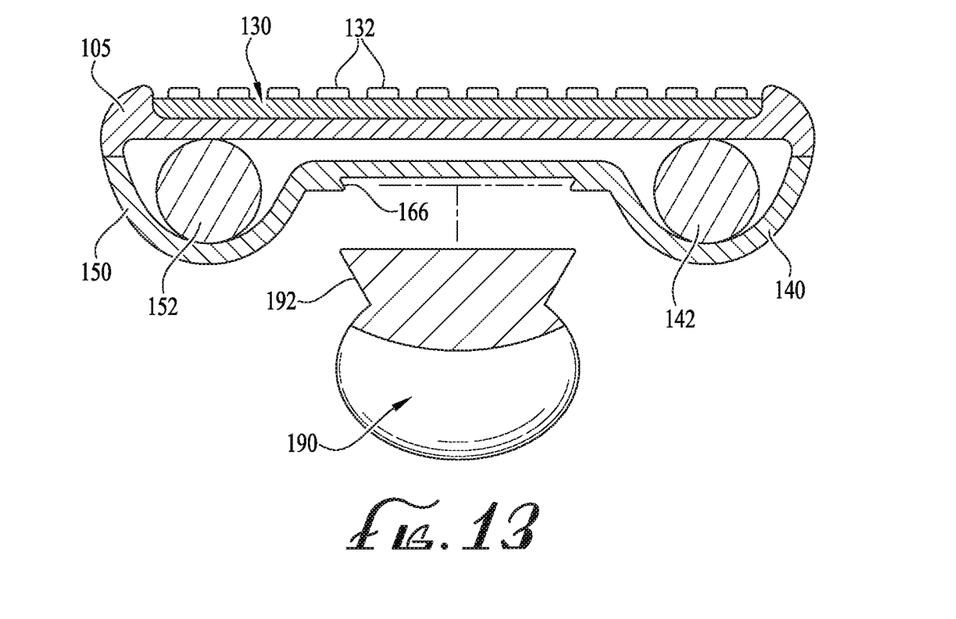
FIG. 13 is a cross-sectional view of FIG. 11 taken along lines 13-13.

FIG. 9 illustrates the PDT 100 of the prior embodiment further indicating an accessory mating area 167 on the underside of the main housing 105 between the battery housing sections 140, 150 and behind the central housing portion 160. The accessory mating area 167 may be used to attach or otherwise mate accessory components to the main housing 105. Possible accessories that may be attached may include a handle (such as the central handle 190 illustrated in FIGS. 11-13), a mounting area such as for mounting on a docking station, magnetic stripe readers, RFID readers, vehicular docks or mounting brackets on a vehicle such as a scooter or a bicycle, a holster or lanyard mount, an orientable stand (e.g., for holding the PDT to enable hands-free scanning), or other suitable accessory. FIGS. 9-13 illustrate one type of mating mechanism for the accessory mating area 167 comprised of a dovetail mount 166, as best shown in FIGS. 9, 10 and 13. The female dovetail 166 in the main housing 105 mates with a male dovetail 192 of the handle 190 as illustrated in FIG. 13. The dovetail connection may be secured by either a friction fit or a suitable locking mechanism. FIGS. 11-13 illustrate a handle 190 mounted to the mating area of the main housing 105 of the PDT 100. The handle 190 being disposed symmetrically along the center axis 22 (as in FIG. 2) permits the user to support and manipulate the PDT 100 with one hand (i.e., single-handed), in a balanced position, thereby freeing the user's other hand to manipulate objects or actuate controls on the keyboard 130 or display screen 120 (if the display screen is a touch screen) or operate/control operation of the data reader 162 of the PDT 100. The handle 190 may also include a finger-operated trigger 194 on a forward surface thereof for activating the data reader (scan engine 162) or other PDT function.

Figure 14:
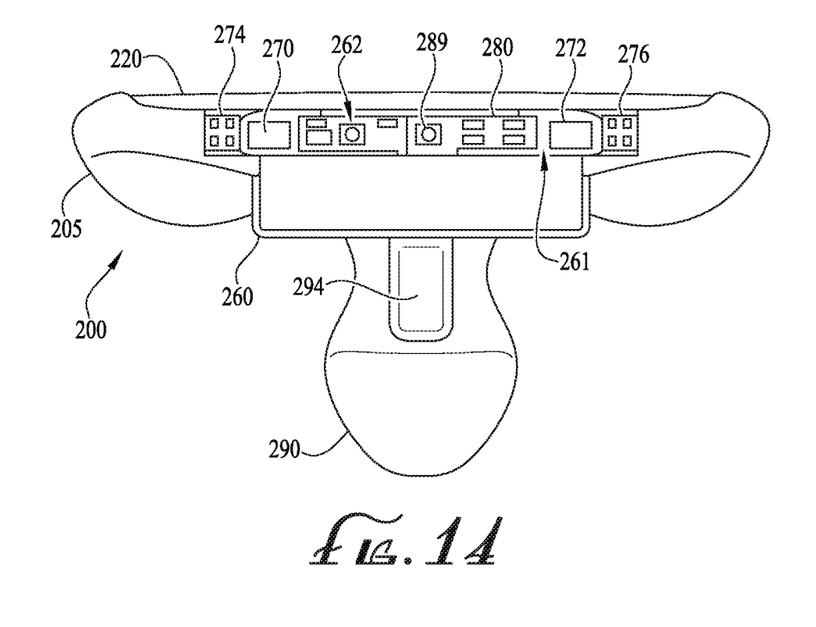
FIG. 14 is a front diagrammatic view of a portable data terminal with a handle accessory installed and an alternate arrangement of an electronics package.

FIG. 14 is a front diagrammatic view of an alternate portable data terminal (PDT) 200 with a handle accessory 290 installed and an alternate arrangement of an electronics package 261. The PDT 200 includes a main housing 205, a landscape oriented display screen 220, and a central housing portion 260 as in the previous embodiment. The PDT 200 has a similar ergonomic shape and properties (with the angled battery housings, large keyboard and large landscape-oriented display screen) as in PDT 100. The handle 290 includes an actuable trigger 294 on a front surface thereof.

The electronics package 261 of PDT 200 is a more elongated version (as compared to the electronics package 161 of PDT 100) extending a greater portion of the width of the PDT main housing 205. The electronics package 261 has similar components to those of the prior embodiment, though a somewhat different arrangement. The electronics package 261 includes a scan engine 262 comprised of a data reader and first and second lighting elements (such as LEDs). The scan engine 262 may be oriented toward a center line of the main housing 205. The package also includes the good read indicator 289, secondary or primary illumination 280 (shown as four LEDs), and left and right cameras 270, 272. The electronics package 261 also includes additional illuminators 274, 276 disposed outside of the left and right cameras 270, 272. These illuminators 274, 276 may provide illumination for the cameras 270, 272 or other reading function.

The width of the electronics package 261 and the distance between the left and right cameras 270, 272 extends a fairly large portion, about 75%, of the overall width of the display screen 220 and the main housing 205.

Figure 15:
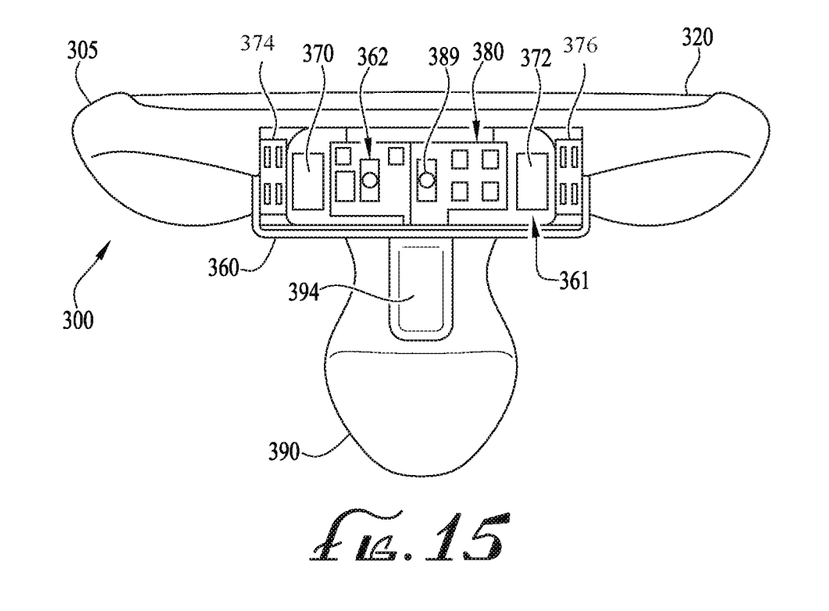
FIG. 15 is a front diagrammatic view of a portable data terminal with a handle accessory installed and a second alternate arrangement of an electronics package.

FIG. 15 is a front diagrammatic view of another alternate portable data terminal (PDT) 300 with its electronics package 361 disposed within a central housing portion 360 and only extends about 50% of the overall width of the display screen 320 of the main housing 305. The PDT 300 is illustrated with a handle section 390 and trigger 394. The PDT 300 has a similar ergonomic shape and properties (with the angled battery housings, large keyboard and large landscape-oriented display screen) as in PDT 100.

The electronics package 361 of PDT 300 includes similar elements as in the PDT 200 of the embodiment of FIG. 14. Components include a scan engine 362 having illuminators (shown as two LEDs); the scan engine 362 being disposed close to the center axis of the main housing 305; a good read indicator 389 disposed adjacent the scan engine 362 and also along/near the center axis of the main housing 305; secondary (or primary) illuminators 380 (shown as four LEDs); left and right cameras 370, 372 separated from each other on opposite sides of the scan engine 362 and good read indicator 389; and alternate illuminators 374, 376 (each with four LEDs) disposed on the outsides of respective left and right cameras 370, 372.

Illuminators 274, 276, 374, 376 may optionally be provided with an orientation mechanism such as the one described in U.S. Published Application No. US 2017-0357837 A1 (U.S. patent application Ser. No. 15/182,336), hereby incorporated by reference, especially FIGS. 22-25, in order to provide an optimal illumination for different reading conditions of both the scan engine and the stereo camera pair.

Comparing the dimensions of the electronics packages 261, 361 of the PDTs 200, 300 of FIGS. 14 and 15, the cameras 370, 372 of the PDT 300 of FIG. 15 may be on the order of at least 35% of the entire width of the display screen 320 but may alternately be at least 50% of the width (as illustrated). The width of the cameras 270, 272 of the electronics package 261 of the PDT 200 in FIG. 14 is larger, potentially on the order of 70% or even 75% (as illustrated) of the width of the display screen 220, or more. In either embodiment, the cameras may be positioned as wide apart as is feasible to enable and enhance the stereoscopic properties/operation.

Figure 16:
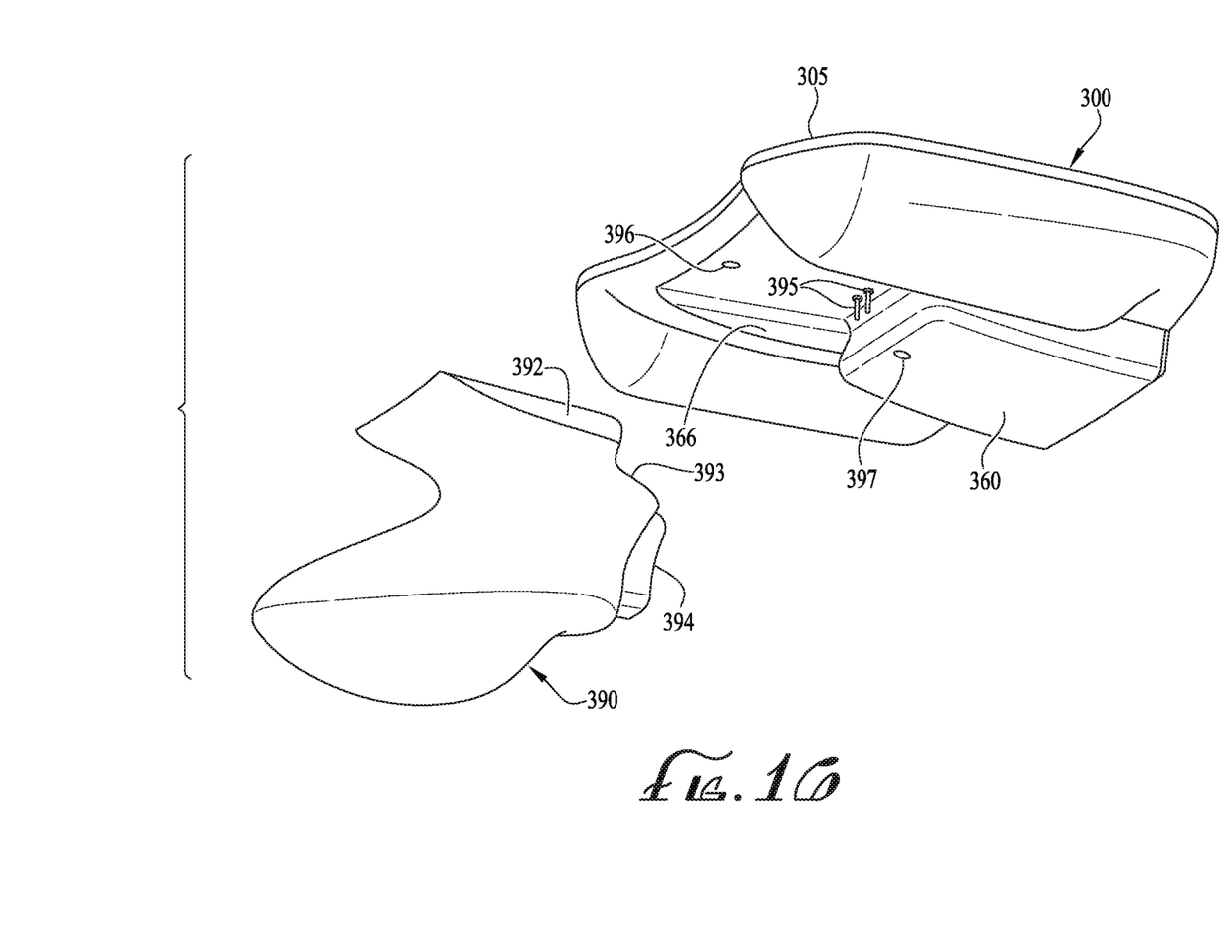
FIG. 16 is an exploded view of an embodiment of a portable data terminal and handle accessory of either FIG. 14 or FIG. 15.

FIG. 16 illustrates the PDT 300 having an alternate mating connection mechanism between the PDT main housing 305 and the handle 390. The PDT 300 includes a main housing 305 and except for the additional mating components, may comprise the same elements as the embodiments of FIG. 1, 14, or 15. The handle 390 comprises an ergonomic shape with an actuable trigger 394 on a forward end thereof such that a user may grip the handle 390 and operate the trigger 394 with a finger to actuate/operate the data reading function or other function/operation of the PDT. The main housing 305 includes a central housing portion 360 and an accessory mating area 366. The accessory mating area 366 includes electrical connectors, in this embodiment/example a male connector pair, shown as male pin connectors 395, which mate with and engage corresponding female pin/plug connectors within the handle 390. The pin connectors 395 provide for electrical connection between the handle 390 and the PDT 300. Any other suitable electrical connectors, e.g., sliding contact connectors, may be employed. A secure mating attachment may be provided by a pair of magnets 396, 397 disposed within the main housing 305 which attracts/engage corresponding magnets or magnetically active (e.g., steel or iron) elements in the upper and lower mating sections 392, 393 of the handle 390. The handle 390 includes an upper mating section 392 (containing the magnetically active element for mating with the magnet 396) and a lower mating section 393 (containing the magnetically active component that engages the magnet 397).

Other embodiments are envisioned. Although the description above contains certain specific details, these details should not be construed as limiting the scope of the invention, but as merely providing illustrations of some embodiments/examples. It should be understood that subject matter disclosed in one portion herein can be combined with the subject matter of one or more of other portions herein as long as such combinations are not mutually exclusive or inoperable.

The terms and descriptions used herein are set forth by way of illustration only and not meant as limitations. It will be obvious to those having skill in the art that many changes may be made to the details of the above-described embodiments without departing from the underlying principles of the inventions.

The invention claimed is:

1. A portable data reader terminal comprising:
   a main housing comprising a central housing portion extending downwardly on an underside of the main housing and having an extended front face;
   a scan engine disposed in a front face of the main housing, the scan engine including an imager and internal electronics configured to read optical codes located within a field of view of the imager; and
   first and second cameras positioned on opposite lateral sides of the scan engine proximate respective left and right lateral edges of the front face of the central housing portion, the first and second cameras configured to operate separately from the scan engine;
   a landscape-oriented display screen disposed on a top front portion of the main housing and extending nearly the width of the main housing;
   a keyboard disposed on top of the main housing and rearward to the display screen; and
   left and right ergonomic handle grips disposed on the underside of the main housing to accommodate two-handed grasping of the portable data reader terminal, wherein the keyboard is constructed and arranged to receive input from a pair of thumbs while corresponding hands are grasping and supporting the main housing.

2. A portable data reader terminal according to claim 1 wherein the central housing portion extends at least 35% of the width of the display screen.

3. A portable data reader terminal according to claim 1 wherein the keyboard comprises a qwerty style keyboard extending a width of the main housing.

4. A portable data reader terminal according to claim 1 wherein the left and right handle grips are arranged angularly inward from a rear of the main housing to a front of the main housing.

5. A portable data reader terminal according to claim 4 wherein the left handle grip comprises a first battery housing accommodating a first battery and the right handle grip comprises a second battery housing accommodating a second battery.

6. A portable data reader terminal according to claim 5 further comprising a downwardly facing enlarged inductive receiving coil charging element disposed in the underside of the main housing between the left handle grip and the right handle grip, the inductive receiving coil element operable to receive a charge from an inductive charging coil when placed in proximity thereto and supply the charge to a power supply including the first battery and the second battery.

7. A portable data reader terminal according to claim 1 further comprising a good read indicator mechanism disposed in the front face of the main housing between the first camera and the second camera, the good read indicator mechanism including an indicator light source configured to project a visible light spot on or in the vicinity of an optical code responsive to the data reader successfully reading the optical code.

8. A portable data terminal according to claim 1 further comprising:
   a central handle extending downwardly from and removably attached to the underside of the main housing in a recessed area between the left handle grip and the right handle grip, the central handle constructed and arranged to accommodate single-handed support and manipulation of the portable data reader terminal.

9. A portable data reader terminal according to claim 1 wherein the first and second cameras are configured as a stereoscopic camera configured to acquire 3D data.

10. A portable data reader terminal according to claim 1 wherein at least one of the first camera or the second camera is a thermal imaging camera.

11. A portable data terminal comprising:
   a main housing having a center axis;
   a landscape-oriented display screen disposed on a top front portion of the main housing and extending a width of the main housing;
   a keyboard disposed on top of the main housing and below the display screen;
   a scan engine disposed in a front face of the main housing and including an imager and internal electronics configured to project a read volume outwardly along the center axis of the main housing and decode optical codes located within the read volume;

a first camera and a second camera disposed in the front face of the main housing on opposing sides of the scan engine, and configured to operate separately from the scan engine;

left and right battery housings disposed on an underside of the main housing to form respective left and right ergonomic handle grips arranged angularly inward from a rear of the main housing to a front of the main housing to accommodate two-handed grasping of the portable data terminal, wherein the keyboard is constructed and arranged to receive input from a pair of thumbs while corresponding hands are grasping and supporting the main housing; and an enlarged downwardly facing inductive receiving coil charging element disposed in the underside of the main housing between the left and right battery housings, the inductive receiving coil element operable to receive a charge from an inductive charging coil when placed in proximity thereto and supply the charge to a power supply disposed in the left and right battery housings.

12. A portable data terminal of claim 11 further comprising a left trigger key disposed on a front of the left battery housing, and a right trigger key disposed on a front of the right battery housing, the left and right trigger keys configured to control one or more functions of the portable data terminal responsive to user input.

13. A portable data terminal according to claim 12 wherein the one or more functions include one or more of a cut, a copy, a paste, or a character insertion for text displayed by the display screen.

14. A portable data terminal according to claim 12 wherein the one or more functions include actuating the scan engine to read optical codes.

15. A portable data terminal according to claim 12 wherein the one or more functions include activating a 3D scan using the first and second cameras.

16. A portable data terminal according to claim 12 wherein the one or more functions include actuating controls during a Voice Over Internet Protocol (VOIP) call.

17. A portable data terminal of claim 11 further comprising a good read illuminator disposed in the front face of the main housing unit between the scan engine and one of the first camera or the second camera, the good read indicator including an indicator light source configured to project a visible light spot on or in the vicinity of an optical code responsive to the data reader successfully reading the optical code.

18. A portable data terminal comprising:
a main housing having an extended front face;
a landscape-oriented display screen disposed on a top forward portion of the main housing and extending nearly to lateral edges of the main housing;
a keyboard disposed on top of the main housing and rearward of the display screen; and
left and right battery housings serving as ergonomic handle grips disposed on an underside of the main housing to accommodate two-handed grasping of the portable data terminal, wherein the keyboard is constructed and arranged to receive input from a pair of thumbs while corresponding hands are grasping and supporting the portable data terminal; and
an electronics package disposed within the extended front face of the main housing, the electronics package including:
a scan engine configured to read optical codes located within its field of view; and
first and second cameras positioned on opposite lateral sides of the scan engine proximate respective left and right lateral edges of the extended front face, the first and second cameras being separated to extend at least 50% of a width of the display screen, and operable separately from the scan engine.

19. A portable data terminal according to claim 18 wherein the display screen has a minimum screen diagonal of 4 inches (10.2 cm).

20. A portable data terminal according to claim 18 wherein the display screen has a minimum screen diagonal of 8 inches (20.3 cm).

* * * * *